J. W. LAWRIE.
PROCESS OF TREATING ALUMINUM SCREENINGS, DROSS, SLAGS, OR ANALOGOUS ALUMINOUS MATERIALS.
APPLICATION FILED AUG. 10, 1914.
1,156,606.
Patented Oct. 12, 1915.
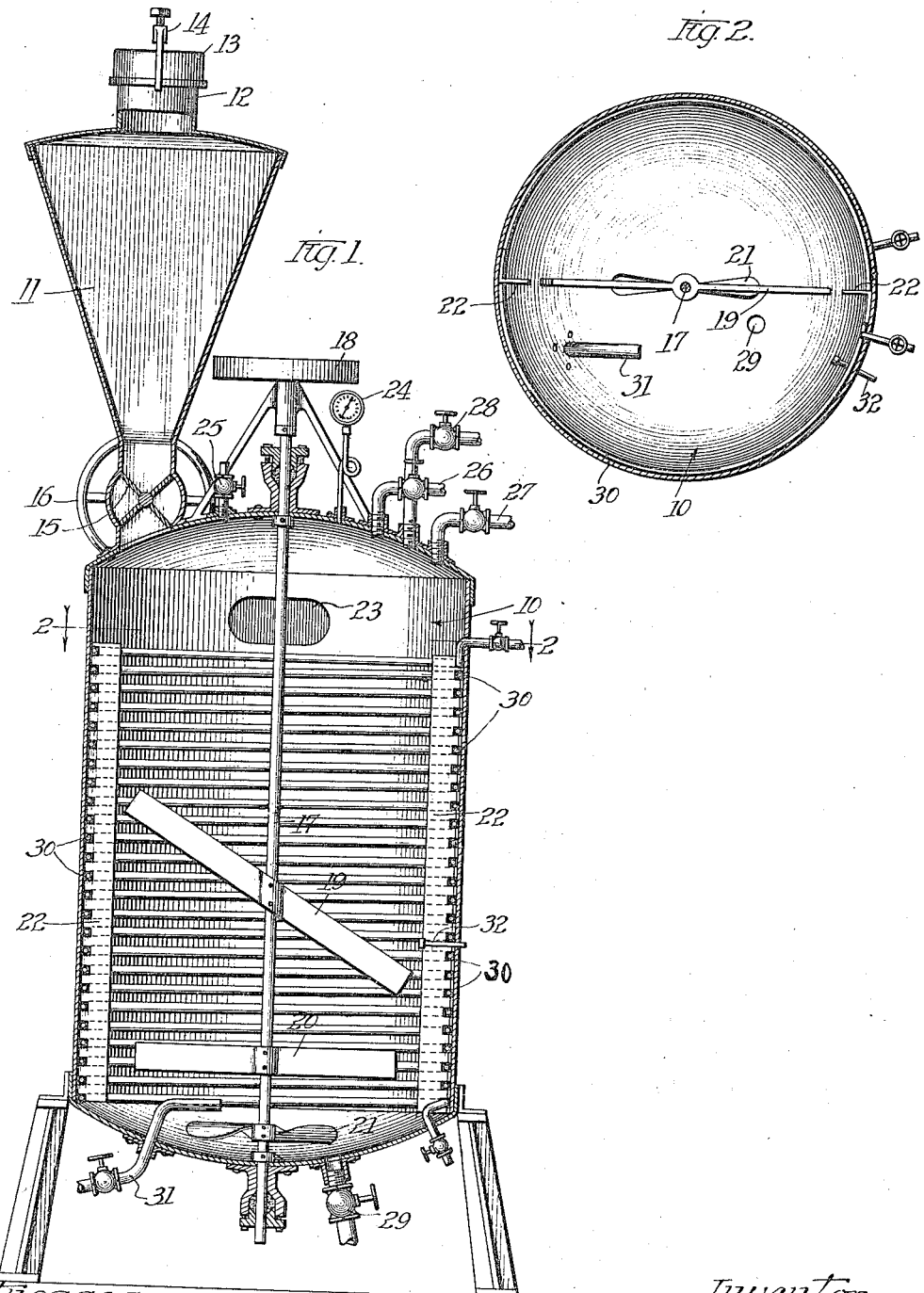
Inventor
James Wright Lawrie

UNITED STATES PATENT OFFICE.

JAMES WRIGHT LAWRIE, OF AURORA, ILLINOIS.

PROCESS OF TREATING ALUMINUM SCREENINGS, DROSS, SLAGS, OR ANALOGOUS ALUMINOUS MATERIALS.

1,156,606. Specification of Letters Patent. Patented Oct. 12, 1915.

Application filed August 10, 1914. Serial No. 856,047.

*To all whom it may concern:*

Be it known that I, JAMES WRIGHT LAWRIE, a citizen of the United States, residing at Aurora, in the county of Kane and State of Illinois, have invented new and useful Improvements in Processes of Treating Aluminum Skimmings, Screenings, Dross, Slags, or Analogous Aluminous Materials, of which the following is a full, clear, concise, and exact description, reference being had to the accompanying drawing, forming a part of this specification.

This invention relates to a process of treating aluminum skimmings, screenings, dross, slags, and the like, obtained usually as a result of aluminum casting operations.

Heretofore, since the beginning of the manufacture of aluminum on any but a laboratory scale this material has been thrown away or allowed to accumulate as a waste product. By my invention it is utilized to form valuable commodities. Such skimmings, screenings, dross and the like are ordinarily of a very complex composition, using the term in its broader sense, for the material contains not only free metal, principally aluminum, iron, copper and zinc and alloys thereof, but also carbon and compounds and salts of these elements such as the oxid, carbid and nitrid of aluminum. Among the commercially valuable materials produced by my process from this hitherto waste product are alumina, ammonia or its salts, copper or its salts, and salts of zinc and iron. The principal product of my process, however, is aluminum in combination either as alumina in commercially pure form or salts of the metal. In order to form the aluminum compound the aluminum content in the material whether in the elemental or combined state or both, is dissolved by means of a caustic alkali, preferably caustic soda, as it is the cheaper. The solution of alumina in caustic soda is not an exothermic reaction but on the contrary requires the application of heat. In fact alumina in its usual form can only be dissolved in caustic by the application of heat and pressure, and heretofore its solution has always been brought about by subjecting it to applied heat of a high degree under pressure. As stated above, the skimmings, screenings and the like to which my invention pertains, contain considerable free aluminum and other metals and certain compounds thereof, the reactions of which with caustic soda are accompanied by the development of great heat.

It is an object of my invention to utilize the heat of this reaction to assist in the conversion of the alumina in the mixture to aluminate, at the same time of course utilizing the aluminate formed from the metal. I find, however, that with the entire metal content of the material and the strength or concentration of solution which is most advantageously employed, the heat and evolution of gas is so great that violent boiling and explosion takes place. In order to avoid this difficulty I separate the larger parts and particles of metal from the material to such an extent that there remains in the latter only enough or less than enough when dissolved to supply the necessary heat to effect the solution of the alumina. Obviously, the amount of aluminum and other metals and alloys to be removed depends on their proportion in the material to the alumina to be dissolved though it is not essential that any exact proportion between the metal and alumina be established, because, if necessary, additional heat may be supplied externally in case the heat from the reaction with the metal is not sufficient to completely dissolve the alumina. I have found, however, that ordinarily the proportion of metal to alumina may be reduced to that which is desirable in carrying out my process by screening the material through a fine screen, after pulverizing it where necessary, so that the larger lumps and particles of metal are removed. After this mechanical operation the material is ready for solution. Owing to the presence of an amount of the finer particles of metal which are not removed by the screening referred to above and of nitrids of aluminum and other compounds which are capable of giving off gas under heat or under the action of an alkali, gas is developed in the treatment which, unless care is taken to prevent it, causes the mixture to foam excessively, and if the mixing, as is preferable, is carried out in a substantially closed tank, dangerous pressure may result. When, however, the process is properly carried out after the removal of the excess metal and in a proper receptacle, the heat effects and pressure produced by the reaction are beneficially utilized in effecting the solution of the aluminous content of the material in the caustic. As heretofore stated, however, if by reason of the removal of too much metal from the material or for any other cause, the heat developed is not sufficient to dissolve all the alumina it may be supplemented by the application of outside heat.

After the solution is complete or substantially so, the alumina is precipitated in substantially pure form, the ammonia developed being stored or utilized and the copper, zinc, etc., may likewise be recovered from the solution. In carrying this step of my process into effect, the following is the preferred procedure.

The solution of caustic soda of suitable concentration is placed in a practically closed tank of any suitable construction. I have found that considerable variation in the strength of the caustic solution, as well as in the proportions of the caustic soda used to material treated, are without great effect upon the results of the process. Thus I have varied the strength of the soda solution from less than 30 per cent. to over 40 per cent. without observing any pronounced difference in the reactions. Likewise, I have varied the amounts of caustic soda used from a quantity such that there are 60 grams of $Na_2O$ to 100 grams of $Al_2O_3$, to a quantity such that there are 150 grams of $Na_2O$ to 100 grams of $Al_2O_3$ contained in the raw material, without noting marked differences. However, to make easier the handling of the aluminate solution after it is once prepared, I prefer to use an amount of soda such that there will be 90 to 135 grams of $Na_2O$ to every 100 grams of $Al_2O_3$ contained in the raw material used. The apparatus used is provided with means for introducing the raw material into the soda without loss of the ammonia or other gases which are evolved in the course of this step; it is supplied also with an adjustable outlet for the escape of the evolved gases either at atmospheric pressure or under higher pressure, and with another outlet for removing the gases at reduced pressure by means of a vacuum pump, and with auxiliary means for artificial heating from an external source, such as by direct steam, or by steam coils or by any other means or combinations. The outlet for the gases is connected with an apparatus for the separation of the ammonia from the other gases by the absorption of the former in water or in acids.

After the caustic solution has been placed into the tank, the material is fed slowly into the solution, the apparatus being closed except for the outlet for the gases, and the caustic solution being continually and vigorously stirred. The rate of the feeding of the solid into the solution should not be too rapid, or the gases will be evolved so suddenly that the mixture will foam extensively and the solution may be forced into and through the opening intended for the escape of the gases. The outlet is fitted with a valve by means of which the rate of escape of the gases is adjusted, thus making it possible to utilize and to control the pressure produced by the liberation of the gases, one advantage of this pressure being that it makes it possible more fully to utilize the heat of reaction. On the other hand, the rate of feeding should not be so slow that the mixtures lose too much of the heat of the reaction or the tank too much of the gases during the process of mixing, for if it were too slow a large part of the advantage of the production of heat and pressure by the reaction would be partially lost. The rate of feeding cannot be stated definitely because it depends somewhat upon the dimensions of the apparatus used and the size of the outlet for the gases—evidently the larger the apparatus used for a given amount of material, the more rapid may be the feeding. If the conditions just described are suitably chosen, 40 to 45 per cent. of the material can be converted into sodium aluminate solution without the application of external heat or pressure. A small amount of gases including ammonia will remain in the aluminate solution and confined in the free space of the tank, and this can be removed by passing steam through the solution or by reducing the pressure in the tank by means of a suitable vacuum pump, or by any other method which reduces the partial pressure of the gases in the tank.

It is possible, however, to recover from the material more than 40 to 45 per cent. of alumina by supplementing the heat of reaction and the pressure produced by the evolution of gases by external heating under pressure. While it is possible to apply external heat simultaneously with the heat produced by the reaction, the reaction is more easily controlled if the following procedure is followed out. The material is mixed with the caustic solution as described above and the process allowed to proceed with the heat of reaction alone until the first vigorous action between the materials has subsided. The mixture is then boiled by application of external heat at atmospheric pressure or at but slightly above atmospheric pressure for about half an hour, by which time practically all of the ammonia will have been removed. The application of heat is then continued under elevated pressure until practically all of the available alumina is dissolved. By this procedure about 10 to 15 per cent. more of alumina can be dissolved by caustic solutions than when only the heat of reaction is utilized.

The accompanying drawing shows an apparatus which has been devised by me and which is suitable for carrying out this step of my invention.

In these drawings—Figure 1 is a vertical section of the apparatus; and Fig. 2 is a horizontal section of the same on the line 2—2 of Fig. 1.

The apparatus comprises a cylindrical metallic tank or vessel 10 closed at the upper end and having connected therewith a feeding chamber 11 for the raw materials which are to be treated. This feeding chamber is provided with a charging opening 12 which may be closed by a cap 13 adapted to be firmly secured in position by the clamp 14 so that gases cannot escape. Means are provided at the lower end of the feeding chamber so that the materials may be fed into the tank at the desired rate, such means comprising the rotating dampers or vanes 15 fitting the passageway leading from the chamber to the tank. These dampers or vanes may be rotated by a pulley or gear wheel 16 or by hand.

In order that the material within the tank may be suitably agitated or stirred, a shaft 17 passes vertically through the center of the tank, suitable stuffing boxes being provided at each end to prevent the escape of the gases, and a pulley or gear 18 is mounted on its upper end by which it may be driven at the desired speed. An inclined stirring vane or blade 19 is secured to the shaft 17 and rotates therewith, and a similar horizontal vane or blade 20 is similarly provided near the lower end of the tank.

In the bottom of the tank a somewhat shorter blade 21 is located on the shaft 17 and is preferably in the form of a propeller to more thoroughly stir and agitate the materials to prevent them from settling to the bottom of the tank. Baffle plates 22, 22 are located at the opposite inner sides of the tank to assist in the stirring operation. A man-hole 23 is provided so that entrance can be effected to the tank for the purpose of inspection, for cleaning out the same, making repairs, etc. The tank or vessel is provided with a suitable pressure gage 24 and with a valve-controlled air inlet 25. A feed pipe 26 having a suitable valve is also provided for feeding liquids into the tank, and it may also be used for feeding the raw material mixed with water into the tank, instead of the chamber 11.

An outlet 27 is arranged for the outlet of the gases evolved during the reaction, said outlet being also valve-controlled, and is connected with suitable apparatus (not fully shown) for collecting and taking care of the said gases produced. An additional valve-controlled outlet 28 is provided through which residual gases may be removed from the tank and solution by means of a vacuum pump. The lower end of the tank is provided with a suitable valve-controlled outlet 29 by which the digested contents may be drawn off.

I also preferably provide the tank with steam coils 30 around the inner periphery of the tank, having an inlet at the upper end of the coils and an outlet at the lower end. In case it is desired to admit live steam to the interior of the tank, a suitable connection 31 is provided therefor at the lower end. The temperatures within the tank may be determined by inserting a suitable thermometer in the thermometer tube 32 connected therewith.

The operation is as follows: The caustic solution is introduced into the tank through the pipe 26, the amount for the average charge being about 2500 pounds of caustic soda or its equivalent dissolved in about 5000 pounds of water. The solid raw material is placed into the feed chamber 11, the cap 13 then securely fastened in position, and all the valves except outlet valve 27 are closed. The dampers or vanes 15 are then rotated at a suitable rate and the stirring blades are put into operation. The valve on outlet 27 and the rate of feeding the solid material are regulated so as to control the pressure and foaming. This is done by observing the pressure gage 24 and the outlet 27, through which latter the solution would escape if the foaming were excessive. The amount of the average solid material introduced in this way is about 3000 pounds. Throughout this process outlet 27 is connected with the apparatus for collecting the ammonia. After the first vigorous reaction is completed, the mixture can be boiled either by admitting steam directly through inlet 31 or by passing steam at a suitable pressure through the coils 30, in order to remove the residual gases. Or these gases may be removed by means of a vacuum pump through outlet 28. While the reaction in the tank is going on, samples of the solution are withdrawn through outlet 29 for analysis. When the analyses show that the reaction has proceeded as far as desired, the tank is emptied through outlet 29. The mixture can be forced directly from the tank through a filter press by applying air pressure through inlet 25. If desired to supplement the heat of reaction by external heat, this can be done either by admitting steam under pressure through pipe 31, or by passing steam at a suitable temperature through the coils 30. This additional heat can be applied at any time during the process, but I prefer to allow the first vigorous reaction to subside before applying external heat. I have obtained good results with the amounts of materials mentioned with an apparatus of the kind described in which the tank 10 was substantially 5 feet in diameter by 7½ feet in height.

Since the original material herein described contains small amounts of copper and zinc, and occasionally very small quantities of lead, the aluminate solution may be contaminated by these substances. Zinc, and lead when present, or their compounds, are apparently in a form that is not easily soluble in the aluminate solution and the copper can dissolve only if the ammonia is not completely driven off. If solution of copper occurs, it is due to an incompleted reaction between the caustic solution and the raw material and can be easily avoided. Hence these impurities are seldom present in more than very small amounts, but if at any time it should be desirable to remove zinc, lead or copper from the aluminate solution this may be done by precipitation—for instance, by the addition of sulfur, alkaline sulfids or other sulfids to precipitate the above mentioned impurities as sulfids. This treatment, which is relatively inexpensive, would, of course, remove also other metals whose sulfids are insoluble in alkaline solution, should such metals ever happen to be present. It is clear that sulfur or sulfids may be added to the alkali before the solid raw material is added, thus producing the same effect. It is also evident that other methods of precipitation may be used, although the precipitation as sulfid is preferred. After the aluminate solution has been prepared and, if necessary, purified, as described above, the solution is separated from the solid residue by suitable means, preferably by filtration. The residue may now be treated for the removal of compounds of copper, of iron and of zinc by suitable means, as, for instance, by treatment with sulfuric acid, or with other acids, whereby salts of these metals or any of their other useful compounds may be obtained by well known means. As an example of the methods which may be used, the following may be cited.

The residue above described may be treated with acids, for example, sulfuric acid, of suitable concentration, for example, 10 per cent., which will dissolve practically all of the copper, zinc and iron compounds. The resulting solution may be separated from the insoluble parts and the copper removed from it in several ways; for instance, the solution may be treated with zinc, thus precipitating the copper as metal and enriching the solution with zinc sulfate, or the solution may be electrolyzed with a potential difference, such as to deposit only the copper. Both of these methods would yield copper which can be utilized as such and a solution containing zinc and iron sulfates and both methods may be made continuous. Or the solution above described may be treated with hydrogen sulfid in the presence of suitable amounts of acid, (for instance, sufficient to make the solution not less than $\frac{1}{4}$ normal with respect to the hydrogen ion), thus precipitating copper sulfid which can be separated from the remaining solution. From this latter zinc sulfid may be precipitated by reducing the acid concentration, for instance, by the addition of zinc dust or carbonate of soda and the various precipitates may be utilized. But other methods known to those skilled in the art may be used.

The aluminate solution prepared as described above is treated for the precipitation of hydrate of alumina by any of the various methods commonly employed for this purpose and the precipitated hydrate of alumina is separated from the remaining solution. The latter, either as it is obtained or after suitable treatment by well known means, such as concentration, recausticization, etc., is utilized to dissolve further portions of the raw material.

While the preceding is the preferred method, various changes may be made in it without departing from the spirit of the invention as set forth in the appended claims. Thus on preparing the aluminate solution the material may be mixed with the solution of alkaline caustic in an open tank. Although in an open vessel much more of the heat of reaction is lost by radiation, temperatures as high as 110 degrees C. have been observed as a result of mixing the materials and its is found that a very large proportion of the aluminum oxid contained in the raw material is dissolved without artificial heat, whereas with the materials heretofore used only a very small proportion of the aluminous content could be dissolved. In an open tank, just as in a closed one, the evolution of gases may produce very objectionable foaming, and consequently the raw materials are mixed with the caustic slowly and with continued vigorous stirring. I prefer, however, to use a closed vessel because thus the heat of reaction can be more advantageously utilized because there is less loss of heat by radiation and because the boiling point of the solution is raised to the pressure produced by the evolved gases, and therefore the solution can be raised to a higher temperature. Furthermore, it is far more difficult to recover the gaseous by-products of the reaction if an open vessel is employed.

Another variation that may be made in the method of preparing the aluminate solution is that the solid may be introduced into the tank first or that the solid and caustic solution may be introduced simultaneously.

Having thus described my invention, what I claim as new and desire to secure by Letters Patent is—

1. The process of treating aluminum skimmings, screenings, dross slags and analogous aluminous materials, which consists in mixing the said material with a solution of alkaline caustic, and utilizing the heat of the resulting reaction in dissolving the aluminous content of said material.

2. The process of treating aluminum skimmings, screenings, dross, slags and analogous aluminous materials, which consists in mixing the said material with a solution of alkaline caustic in a substantially closed vessel, and utilizing the heat of the resulting reaction in dissolving the aluminous content of said material.

3. The process of treating aluminum skimmings, screenings, dross, slags and analogous aluminous materials, which consists in mixing the said material with a solution of alkaline caustic, utilizing the heat of the resulting reaction to dissolve the larger part of the aluminous content of the material, subsequently driving the residual gases out of the mixture, and then dissolving the additional available aluminous content of the material by the application of heat from an external source.

4. The process of treating aluminum skimmings, screenings, dross, slags and analogous aluminous materials, which consists in mixing the said material with a solution of alkaline caustic, utilizing the heat of the resulting reaction in dissolving the aluminous content of said material, and precipitating from the resulting aluminate solution the zinc, copper and other impurities.

5. The process of treating aluminum skimmings, screenings, dross, slags and analogous aluminous materials, which consists in mixing the said material with a solution of alkaline caustic, utilizing the heat of the resulting reaction to dissolve the larger part of the aluminous content of the material, subsequently driving the residual gases out of the mixture, then dissolving the additional available aluminous content of the material by the application of heat from an external source, separating the resulting aluminate solution from the solid residue, treating the latter with acids, and precipitating the copper from the resulting solution.

6. The process of treating aluminum skimmings, screenings, dross, slags and analogous aluminous materials, which consists in mixing the said material with a solution of alkaline caustic in a substantially closed vessel, utilizing the heat of the resulting reaction in dissolving the aluminous content of said material precipitating from the resulting aluminate solution the zinc, copper and other impurities, separating the purified aluminate solution from the solid residue, treating the latter with acids, and precipitating the copper from the resulting solution.

7. The process of treating aluminum skimmings, screenings, dross, slags and analogous aluminous materials, which consists in mixing the said material with a solution of alkalne caustic, utilizing the heat of the resulting reaction to dissolve the larger part of the aluminous content of the material, subsequently driving the residual gases out of the mixture, then dissolving the additional available aluminous content of the material by the application of heat from an external source, precipitating from the resulting aluminate solution the zinc, copper and other impurities, separating the purified aluminate solution from the solid residue, treating the latter with acids, and precipitating the copper from the resulting solution.

8. The process of treating aluminum skimmings, screenings, dross, slags and analogous aluminous materials, which consists in removing the larger particles of metal therefrom, mixing the remaining material with a solution of caustic alkali, utilizing the heat of the resultant reaction to dissolve the larger part of the aluminous content of the material.

9. The process of treating aluminum skimmings, screenings, dross, slags and analogous aluminous materials, which consists in reducing the metal content of the material to a suitable point, mixing the remaining material with a solution of caustic alkali and utilizing the heat of the resultant reaction to dissolve the aluminous content of the material.

In witness whereof, I have hereunto subscribed my name in the presence of two witnesses.

JAMES WRIGHT LAWRIE.

Witnesses:
  GERTRUDE L. LINTNER,
  WM. F. CONGDON.